United States Patent
Stegmaier (10) Patent No.: US 9,063,545 B2
(45) Date of Patent: Jun. 23, 2015

(54) PRESSURE-REGULATING ARRANGEMENT WITH A PRESSURE-REGULATING VALVE AND HYDRAULIC CIRCUIT THEREFOR

(71) Applicant: Robert Bosch GmbH, Stuttgart (DE)

(72) Inventor: Horst Stegmaier, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 279 days.

(21) Appl. No.: 13/712,537

(22) Filed: Dec. 12, 2012

(65) Prior Publication Data

US 2013/0160873 A1   Jun. 27, 2013

(30) Foreign Application Priority Data

Dec. 23, 2011   (DE) .......................... 10 2011 122 366

(51) Int. Cl.
| | |
|---|---|
| G05D 7/01 | (2006.01) |
| F04B 49/08 | (2006.01) |
| G05D 16/10 | (2006.01) |
| F15B 11/16 | (2006.01) |
| F04B 49/00 | (2006.01) |
| F15B 13/02 | (2006.01) |

(52) U.S. Cl.
CPC ............ *G05D 7/0126* (2013.01); *G05D 16/103* (2013.01); *F04B 49/08* (2013.01); *F15B 11/165* (2013.01); *F04B 49/002* (2013.01); *F15B 13/025* (2013.01)

(58) Field of Classification Search
CPC ...... F04B 49/002; F04B 49/007; F04B 49/08; F04B 2205/08; F15B 2211/20553; F15B 11/17; F15B 11/165; G05D 7/126
USPC .................... 137/115.15, 489, 505.15, 505.4, 137/565.14, 625.61; 60/430, 447, 450, 452; 417/216
See application file for complete search history.

(56) References Cited

U.S. PATENT DOCUMENTS

| | | | | |
|---|---|---|---|---|
| 4,203,712 A | * | 5/1980 | Uehara | ......................... 417/218 |
| 4,408,453 A | | 10/1983 | Westveer | |
| 4,745,746 A | | 5/1988 | Geringer | |
| 7,798,277 B2 | * | 9/2010 | Juricak et al. | ................. 180/307 |

OTHER PUBLICATIONS

"Axial Piston Variable Displacement Pump A4VG," Rexroth Bosch Group, 52 pages, XP-00236341, RE 92 003/11.03.
Rexroth Bosch Group; Axial Piston Variable Pump AA4VG; Data Sheet RA 92003-A/06.09; 64 Pages.

* cited by examiner

*Primary Examiner* — Atif Chaudry
(74) *Attorney, Agent, or Firm* — Maginot, Moore & Beck LLP (57) ABSTRACT

A pressure-regulating arrangement includes a main line through which a flow can pass from an intake to an output and in which an adjustable nozzle is arranged. The pressure-regulating arrangement further includes a pressure-regulating valve having a pressure connection which is connected to the main line downstream of the nozzle. A valve body of the pressure-regulating valve is movable from a basic position in an opening direction to increase an outlet pressure of an outlet connection. A first pressure which is tapped off from the main line upstream of the nozzle acts in the opening direction. The outlet pressure and a second pressure, which is tapped off from the main line downstream of the nozzle, act in a closing direction, which is opposed to the opening direction, in order to reduce the outlet pressure.

8 Claims, 5 Drawing Sheets

PRESSURE-REGULATING ARRANGEMENT WITH A PRESSURE-REGULATING VALVE AND HYDRAULIC CIRCUIT THEREFOR

This application claims priority under 35 U.S.C. §119 to patent application no. DE 10 2011 122 366.9, filed on Dec. 23, 2011 in Germany, the disclosure of which is incorporated herein by reference in its entirety.

BACKGROUND

The disclosure relates to a pressure-regulating arrangement with a pressure-regulating valve according to the description below and to a closed hydraulic circuit with a pressure-regulating arrangement of this type.

In the case of pressure-regulating valves, an outlet pressure of an outlet connection is intended to be adjusted and, for example, kept constant even under a variable inlet pressure of an inlet connection. For this purpose, a valve body of the pressure-regulating valve requires a control surface which is acted upon by the outlet pressure and at which the outlet pressure acts upon the valve body counter to a spring in the direction of reducing a flow opening from the inlet connection to the outlet connection. In this case, the flow opening can be regarded as an adjustable restrictor. Of course, regulation is undertaken only if the inlet pressure is greater than the adjusted outlet pressure.

Furthermore, pressure-regulating valves are known, in which, in addition to the connection to the inlet pressure, the outlet connection can also be relieved to a tank connection. The outlet pressure can therefore be actively reduced even if said outlet pressure rises above the regulating pressure for whatever reason. For this purpose, the valve body is centered in a central regulating position and can be moved in a first direction in order to reduce the outlet pressure and in an opposite direction in order to increase said outlet pressure. The two different valves may also be linguistically delimited from each other by only the valve with the possibility of connecting the regulating outlet to the tank being referred to as a pressure-regulating valve, and the valve without this possibility being referred to as a pressure-reducing valve.

It is known from the applicant's product information RA 92003-A/03.09 or RA 92003-A/06.09 to use pressure-regulating valves of this type for regulating an adjusting pressure which is used to adjust a main pump, the suction volume of which is adjustable, of a closed circuit. For this purpose, an above-described pressure-regulating valve is connected on the inlet side to a feed line into which feed pressure medium is conveyed by a feed pump coupled to the main pump. An orifice plate is arranged in the feed line, through which the feed pressure medium passes, at which a variable pressure drop arises depending on the rate of feed pressure medium passing therethrough. The valve body of the pressure-regulating valve—in addition to the above-described action thereupon by the adjusting pressure to be regulated and by the spring or the springs—is acted upon in the opening direction by the pressure upstream of the orifice plate and in the closing direction by the reduced feed pressure downstream of the orifice plate. Therefore, a rotational-speed-dependent outlet pressure at the pressure-regulating valve and therefore a rotational-speed-dependent adjusting pressure for an adjustable main pump are produced and regulated via pressure-regulating arrangements of this type, since the feed pump is conventionally a fixed displacement pump, and therefore the rate of the feed pressure medium which said pump conveys depends on the rotational speed of said pump and therefore on the rotational speed of the main pump.

A disadvantage of regulating an outlet pressure via pressure-regulating arrangements of this type is that, due to the orifice plate, there is a fixed dependency of the outlet pressure on the rotational speed of the variable displacement pump.

In the event of use of the rotational-speed-dependent control of a variable displacement pump, a certain dependency of the adjusting pressure on the rotational speed is not the most suitable for all of the operating ranges and in particular not for all uses of the variable displacement pump. For different uses, orifice plates having different flow cross sections are therefore also used.

By contrast, the disclosure is based on the object of providing a pressure-regulating arrangement with a pressure-regulating valve, in which the dependency of the outlet pressure on the volumetric flow of a main line supplied on the inlet side and the characteristic of the outlet pressure can be changed and also readjusted depending on the volumetric flow. This object is achieved by a pressure-regulating arrangement with the features described below.

With regard to a hydraulically closed circuit with a pressure-regulating valve which serves for the rotational-speed-dependent control of a variable displacement pump, it is the object to be able to adapt the components of the closed circuit to the requirements of different use situations in a simple manner. This object is achieved by a circuit with the features described below.

SUMMARY

The pressure-regulating arrangement according to the disclosure has a main line through which a flow can pass from an intake to an output and in which a nozzle or orifice plate or restrictor is arranged. Furthermore, the pressure-regulating arrangement has a pressure-regulating valve with a pressure connection, a tank connection and a regulating connection. The pressure connection is connected to the main line preferably downstream of the nozzle. An outlet pressure in the regulating connection is adjustable via the pressure-regulating valve, wherein said outlet pressure is connected to the inlet connection via a valve body of the pressure-regulating valve in order to increase the outlet pressure. A first pressure which is tapped off from the main line upstream of the nozzle acts on the valve body of the pressure-regulating valve in the direction of said connection. The outlet pressure and a second pressure which is tapped off from the main line downstream of the nozzle act in the direction of closing the connection between the pressure connection and the regulating connection and in the direction of connecting the regulating connection to the tank connection. In this case, the nozzle or orifice plate or restrictor is adjustable. The dependency of the outlet pressure on the volumetric flow of the main line—or characteristic of the outlet pressure in dependence on the volumetric flow—can therefore be changed and readjusted.

In a particularly preferred development of the pressure-regulating arrangement according to the disclosure, the valve body is precentered in a basic position by a spring arrangement. Starting from said basic position, a connection for the pressure connection to the regulating connection can be opened in the opening direction and a connection from the regulating connection to the tank connection of the pressure-regulating valve can be opened in the closing direction.

In this case, it is simple in terms of the device if the spring arrangement has precisely one spring, the two end sections of which are carryable along and movable by the valve body. The prestressing of the spring can be adjustable by means of a thread. It is therefore possible to establish from which pressure differential via the orifice plate the regulation of the outlet pressure begins, and therefore the characteristic of the dependency of the outlet pressure is displaceable by the pressure differential via the orifice plate.

In a particularly preferred development of the pressure-regulating valve, the valve body is a stepped piston. A first control surface, which is acted upon by the first pressure, and a first control pressure space are formed in the region of a first end section of the stepped piston. A second control surface, which is acted upon by the second pressure, and a second control pressure space are formed in the region of a second end section of the stepped piston. The two control surfaces can be assembled from individual partial surfaces which are arranged at different points of the particular end section and together produce an effective control surface. An annular surface which is acted upon by the outlet pressure is arranged between the two end sections.

In a preferred, compactly configured development of the pressure-regulating arrangement according to the disclosure, the main line can be formed as a channel in a housing of the pressure-regulating arrangement.

In a preferred embodiment, a parallel section of the main line runs approximately parallel to the stepped piston. The nozzle can then be arranged in an approximately right-angled bend at the end of the parallel section, as viewed in the direction of flow, and can be formed there by the overlapping of two passage openings which are movable with respect to each other.

The first passage opening can be provided on the housing and the second passage opening can be formed in a circular cylindrical adjusting part which is rotatable about an axis of rotation running approximately at a right angle to the parallel section.

The edges of the two passage openings are then theoretically arranged on a common circular cylindrical surface and virtually on circular cylindrical surfaces which are directly adjacent to one another.

In order to adjust the diameter of the nozzle and therefore of the pressure drop via the at a given volumetric flow, the circular cylindrical adjusting part can be rotatable manually. This provides a simple possibility in terms of device for changing the characteristic of the outlet pressure via the volumetric flow. For this purpose, the end side of the adjusting part can have a receptacle for a tool.

In a preferred refinement of the valve body, the first control surface and the second control surface are much larger than the annular surface.

An outside diameter of the annular surface and the diameters of the first control surface and of the second control surface are preferably the same size. The ratio of an inside diameter of the annular surface to the outside diameter may be 10/11.

The second control surface is preferably connected via a longitudinal bore of the stepped piston to at least one radial bore—preferably a bore star—of the stepped piston. The radial bore or the bore star is arranged between the first control surface and the annular surface.

In the development of the pressure-regulating arrangement according to the disclosure with the possibility of an active reduction of pressure by connection to the tank connection, it is preferred if the annular surface is surrounded by an outlet pressure space formed in a housing of the pressure-regulating arrangement. In this case, a tank pressure space formed in the housing is formed between the second control pressure space and the outlet pressure space and is connected—for example via a tank channel—to the tank connection.

In a compactly configured pressure-regulating arrangement, the main line with the nozzle and the pressure-regulating valve are arranged in a common housing.

The closed hydraulic circuit according to the disclosure has a variable displacement pump to which two working lines are connected, wherein pressure medium can be conveyed in each case into the working line conducting low pressure via a feed line by a constant feed pump coupled mechanically to the variable displacement pump. In this case, an above-described pressure-regulating arrangement is provided, the main line of which forms a section of the feed line, and the regulating connection of which is connected to an adjusting device of the variable displacement pump. Adaptation to different requirements is possible by adjustment of the opening cross section of the nozzle and therefore of the pressure drop at the nozzle.

In order to adjust the nozzle, the circular cylindrical adjusting part can be rotatable electrically. The characteristic of the outlet pressure can therefore be readjusted or changed via the volumetric flow during the operation of the pressure-regulating arrangement according to the disclosure in dependence on an operating state of the variable displacement pump.

A pressure cutting-off device is preferably connected to an adjusting pressure line which connects the outlet connection of the pressure-regulating device to the adjusting device. Said pressure cutting-off device can be used to limit the adjusting pressure of the adjusting pressure line in dependence on the high pressure of the corresponding working line in such a manner that a certain high-pressure level is not exceeded.

In an advantageous refinement, the pressure cutting-off device has a pressure cutting-off valve which is connected to the two working lines via a shuttle valve—preferably via respective control pressure lines.

BRIEF DESCRIPTION OF THE DRAWINGS

An exemplary embodiment and a use example of the pressure-regulating arrangement according to the disclosure are described in detail below with reference to the drawings, in which.

DETAILED DESCRIPTION

Figure 1:
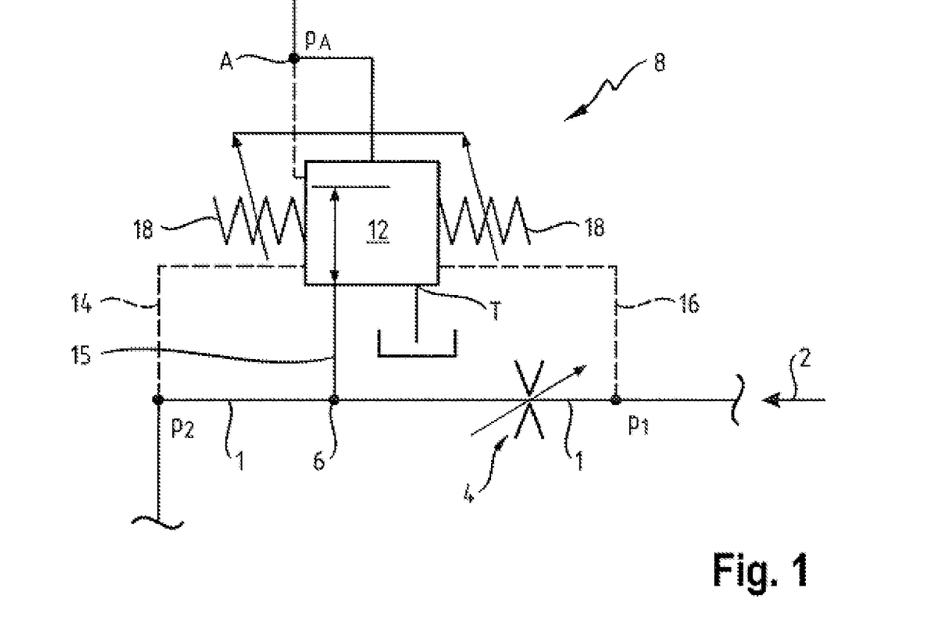
FIG. 1 shows a circuit diagram of the exemplary embodiment of the pressure-regulating arrangement according to the disclosure.

FIG. 1 shows a circuit diagram of the exemplary embodiment of the pressure-regulating arrangement according to the disclosure. Said pressure-regulating arrangement has a main line 1 through which a pressure medium passes with a variable volumetric flow in the direction of an arrow 2. In this case, an adjustable nozzle 4 is arranged in the main line 1. A pressure connection 6 of a pressure-regulating valve 8 is arranged in the direction of flow downstream of the nozzle 4. The flow can pass through the pressure-regulating valve 8 from the pressure connection 6 to an outlet connection (regulating connection) A, wherein an outlet pressure $p_A$ at the regulating connection A is regulated by the position of a continuously adjustable stepped piston 12. In this case, the stepped piston 12 is acted upon in accordance with the basic principle of a pressure-decreasing valve by the outlet pressure $p_A$ in the direction of closing the fluidic connection between the pressure connection and the regulating connection. A pressure $p_2$ which is tapped off at the main line 1 downstream of the nozzle 4 and is conducted to the stepped piston 12 via a second control line 14 likewise acts in the closing direction. By contrast, a pressure $p_1$ which is tapped off at the main line 1 upstream of the nozzle 4 and is conducted to the stepped piston 12 via a first control line 16 acts on the stepped piston 12 in an opening direction of the abovementioned connection.

The stepped piston 12 is prestressed in a central basic position via a spring 18 acting counter to the opening direction and counter to the closing direction. Starting from the basic position, the connection from the pressure connection 6 to the regulating connection A is opened in the opening direction. Starting from the basic position, a connection from the regulating connection A to a tank connection T is opened in the closing direction, and therefore the outlet pressure $p_A$ can be actively reduced by the pressure-regulating valve 8.

Figure 2:
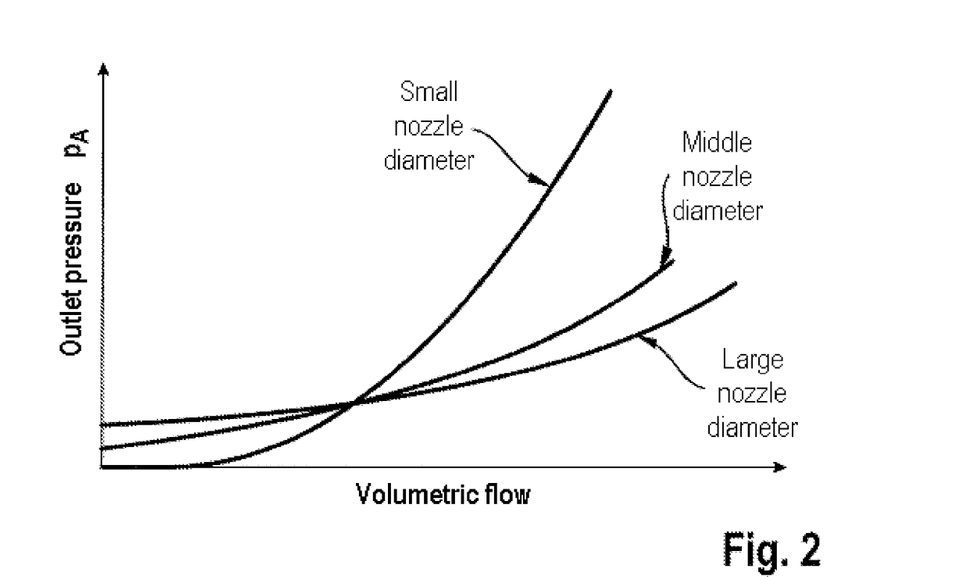
FIG. 2 shows a diagram of the outlet pressure in dependence on the volumetric flow to the exemplary embodiment of the pressure-regulating arrangement according to the disclosure.

The adjustable nozzle 4 produces a pressure drop $p_1$-$p_2$ in dependence on the volumetric flow in the main line 1. Said pressure drop $p_1$-$p_2$ influences the outlet pressure $p_A$ of the pressure-regulating arrangement or of the pressure-regulating valve 8. FIG. 2 shows a diagram of the outlet pressure $p_A$ depending on the volumetric flow (compare arrow 2 in FIG. 1) in the main line 1. In this case, for three different diameters of the adjustable nozzle 4, three correspondingly different characteristics are plotted by way of example. A changed characteristic of the pressure-regulating arrangement according to the disclosure can therefore be selected via an adjustment of the adjustable nozzle 4. In more precise terms, an increase in the diameter of the adjustable nozzle 4 results in a basically reduced pressure drop $p_1$-$p_2$ at said nozzle, and therefore an increase in the volumetric flow in the main line 1 causes a comparatively small increase in the outlet pressure $p_A$ at the outlet connection A while, conversely, a reduced diameter of the adjustable nozzle 4 results, in the event of an increase in volumetric flow in the main line 1, in an increased pressure drop $p_1$-$p_2$ at the nozzle 4 and therefore in a greater increase in the outlet pressure $p_A$. It should also be pointed out that the pressure $p_2$ customarily remains at a certain level because of a connected pressure-limiting valve.

Figure 3:
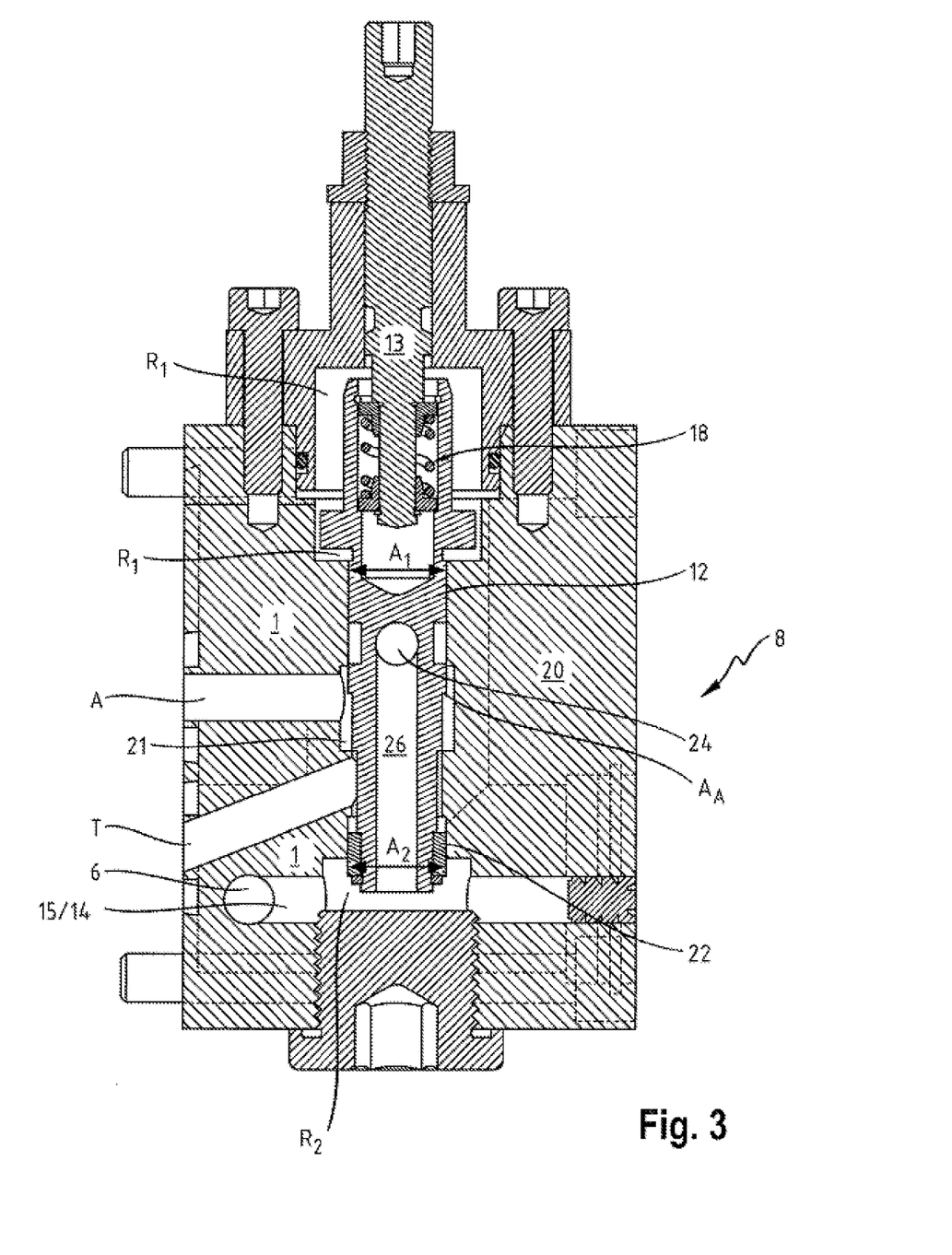
FIG. 3 shows a first section through the physical exemplary embodiment of the pressure-regulating arrangement according to the disclosure.

FIG. 3 shows a first sectional side view of the exemplary embodiment of the pressure-regulating arrangement according to the disclosure. In this case, components of the pressure-regulating valve 8 are in particular shown in the sectional plane shown while parts of the main line 1 can be seen in transparent form downstream of the sectional plane. This is explained in detail with respect to FIG. 4.

The stepped piston 12 (in FIG. 3) is accommodated in a housing 20 so as to be longitudinally movable. In this case, the stepped piston 12 is shown in the central basic position thereof, in which the regulating connection A is not connected either to the tank connection T or to the pressure connection 6 of the pressure-regulating valve 8. For this purpose, the spring 18, which is designed as a compression spring, is in contact by means of the two end sections thereof via two spring plates with the stepped piston 12 and at the same time with a journal 13 mounted on the housing at two different locations and with two different directions of force. The spring 18 therefore acts via the upper spring disk in FIG. 3 counter to the opening direction (viewing the connection between the pressure connection and regulating connection) and via the lower spring plate in FIG. 3 counter to the closing direction (viewing the connection between the pressure connection and regulating connection) of the stepped piston 12. In this case, in the region of the spring 18, a first control pressure space $R_1$ is arranged on an end section of the stepped piston 12 which is the upper section in FIG. 3, said control pressure space acting in the opening direction of the stepped piston 12 via a balanced, effective first control surface (symbolized by a diameter arrow) $A_1$. A second control pressure space $R_2$ is arranged on an end section of the stepped piston 12, the lower end section in FIG. 3, said control space acting in the closing direction of the stepped piston 12 via an end-side second control surface (symbolized by a diameter arrow) $A_2$. In this case, an outer edge of the second control surface $A_2$ is formed via a ring 22 which, for installation reasons, is fastened to the stepped piston 12. In the exemplary embodiment shown, the two control surfaces $A_1$ and $A_2$ acting counter to each other are the same size and have, for example, a diameter of 11 mm each.

In a central region of the housing 20 and of the stepped piston 12, the regulating connection A is connected to the stepped piston 12 via a radial channel and via a central outlet pressure space 21. In more precise terms, an annular surface $A_4$, the radial extent of which is 1 mm, is arranged in this central region of the stepped piston 12. The outlet pressure $p_A$ acts in the closing direction of the stepped piston 12 via said annular surface $A_4$.

A bore star having a plurality of radial bores 24 is arranged between the central pressure space 21 and the first end section of the stepped piston 12, the upper end section (in FIG. 3), the bore star being connected via a longitudinal bore 26 of the stepped piston 12, the second control pressure space $R_2$ and the channel 15 to the pressure connection 6. The pressure connection 6 can be connected to the outlet pressure space 21 and therefore to the regulating connection A via the radial bores 24. The further connection of the regulating connection A to the tank connection T can be opened via an encircling control edge of the stepped piston 12.

The first control pressure space $R_1$ is connected to the main line 1 upstream of the adjustable nozzle 4 via the first control line 16 (shown in FIG. 1 and in FIG. 5) while the second control pressure space $R_2$ is connected to the main line 1 downstream of the adjustable nozzle 4 via the second control line 14, which coincides with the channel 15, and via the pressure connection 6.

Figure 4:
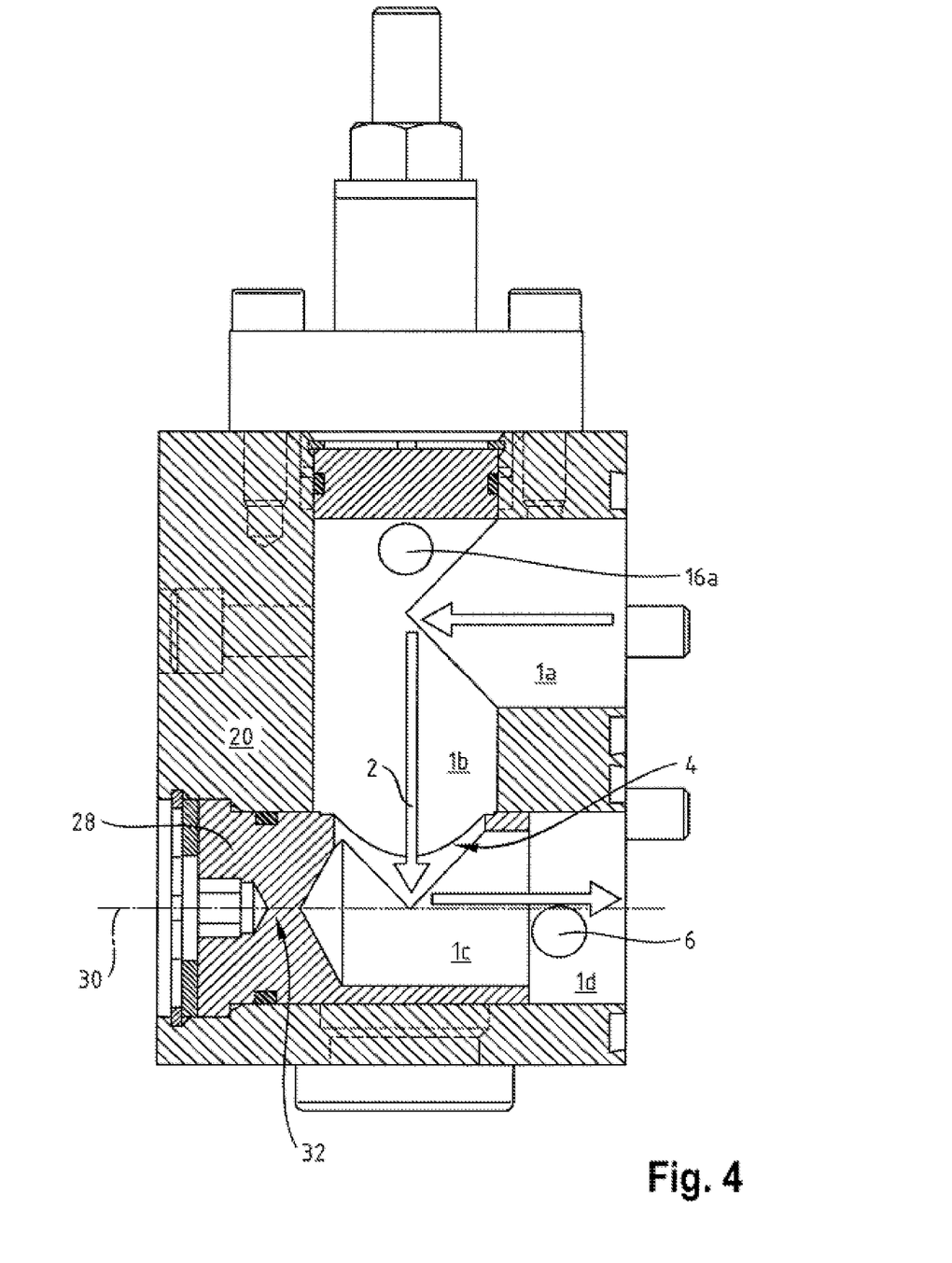
FIG. 4 shows a second section, which lies parallel to the first section, through the exemplary embodiment.

FIG. 4 shows a second section, partly illustrated in transparent form, through the exemplary embodiment of the pressure-regulating arrangement according to the disclosure. The latter is rotated in relation to the illustration according to FIG. 3 through 180 degrees about an axis running parallel to the axis of the stepped piston 12. The main line 1 which runs in the common housing 20 of the pressure-regulating arrangement is illustrated in particular. The main line 1 has four channel sections 1a, 1b, 1c, 1d through which the pressure medium passes in the sequence mentioned. An approximately right-angled bend of the main line 1 is provided in each case between the two channel sections 1a and 1b, on the one hand, and between the two channel sections 1b and 1c, on the other hand. A first control connection 16a via which the first control line 16 (compare FIGS. 1 and 5) is connected to the main line 1 is arranged in the region of the first bend between the channel sections 1a and 1b. The pressure connection 6, which serves at the same time as a second control connection, is arranged in the region of the channel section 1d on the outlet side. The second control pressure space $R_2$ (compare FIG. 3) is connected to the main line 1 via the pressure connection 6.

The channel sections 1a, 1b and 1d are formed directly in the housing 20 while the channel section 1c is formed as a blind bore in an adjusting part 28. The latter is approximately circular cylindrical and is rotatable about the longitudinal axis or axis of rotation 30 thereof. The latter runs transversely with respect to a longitudinal axis of the stepped piston 12.

The adjustable nozzle 4 is formed between the housing-mounted channel section 1b and the rotatable adjusting part 28 or the channel section 1c formed in the latter.

Without the adjusting part 28, there would be a flow cross section, which corresponds to the cross section of the channel section 1b, between the channel section 1b and the channel section 1d. Said cross section can be considered to be a flow cross section of a passage opening which is provided on the housing and is bounded by the edge of the cut between the two channel sections 1b and 1c. When the adjusting part is used, a flow of pressure medium from the channel section 1b into the channel section 1d of the main line 1 is possible only via the channel section 1c, which is formed as a blind bore in the adjusting part 28, and a passage opening 34 which passes in the form of a radial bore through the wall of the adjusting part 28 and opens into the blind bore (also see FIG. 5). The diameter of the passage opening 34 is smaller than the diameter of the channel section 1b, thus resulting in a maximum flow cross section when the adjusting part 28 is in such a rotational position that the passage opening 34 is completely open with respect to the channel section 1b. By rotation of the adjusting part 28, the passage opening can be rotated changed to a greater or lesser extent from overlapping with the channel section 1b. As a result, the size of the effective passage opening between the channel section 1b and the channel section 1c, and therefore the nozzle 4, can be adjusted. The flow cross section of the nozzle is therefore determined in each case by the area of the passage opening 34 that is open towards the channel section 1b.

In order to adjust the nozzle 4, a hexagon socket 32 which is accessible from the outside is formed on the end side of the adjusting part 28, and a tool can be inserted into said hexagon socket—even during the operation of the pressure-regulating arrangement according to the disclosure—in order thereby to select a different characteristic (compare FIG. 2).

Figure 5:
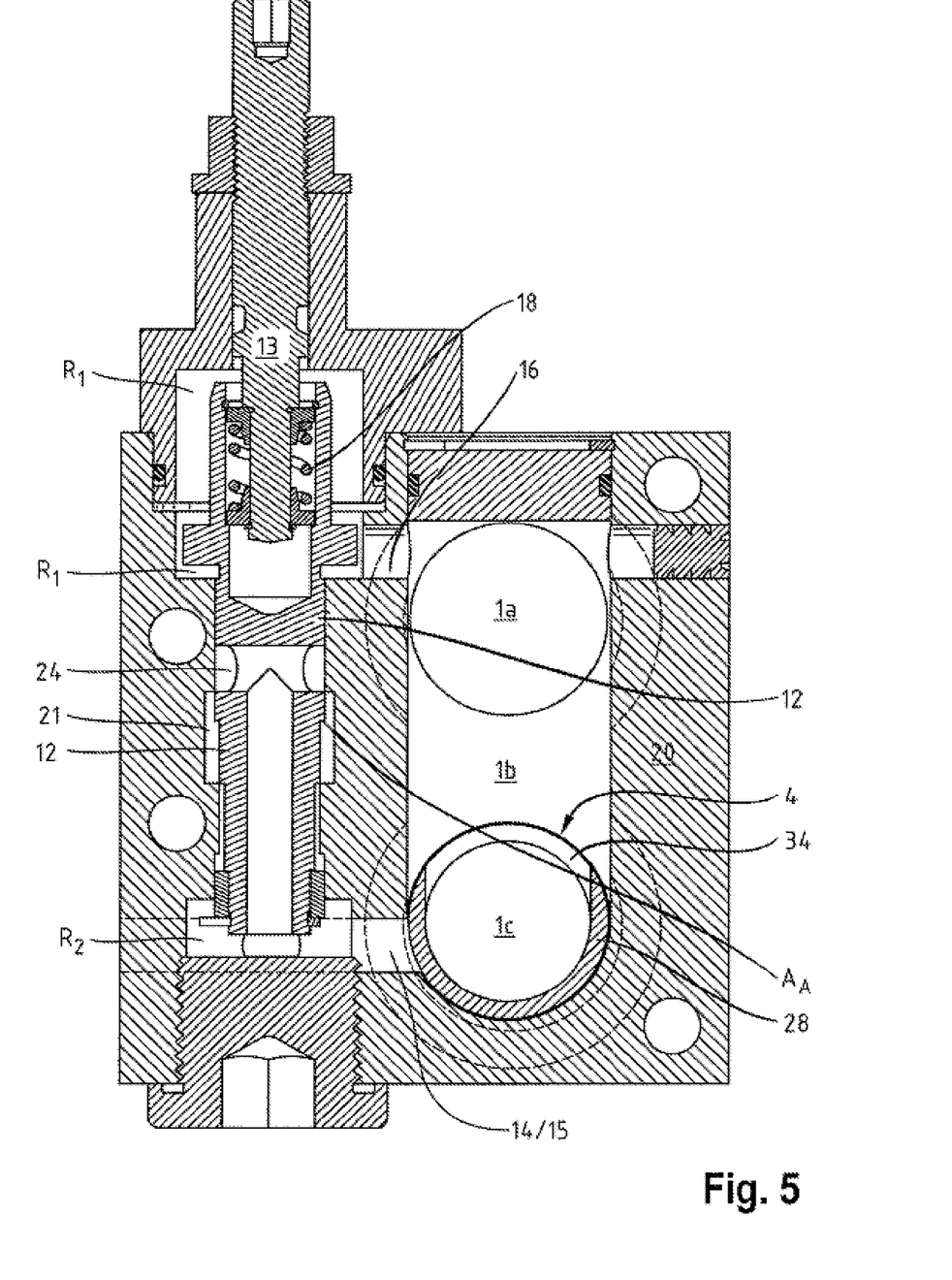
FIG. 5 shows a third section, which runs perpendicularly to the two other sections, through the exemplary embodiment.

FIG. 5 shows a third section through the exemplary embodiment of the pressure-regulating arrangement according to the disclosure. The section runs perpendicularly to the two sections from FIGS. 3 and 4 and passes through the axis of the stepped piston 12. It is shown in FIG. 5 that the two channel sections 1a and 1c of the main line 1 run transversely with respect to the longitudinal axis of the stepped piston 12 and transversely with respect to the channel section 1b. Furthermore, the arrangement of the adjustable nozzle 4 is shown. In particular, the second passage opening 34, which is assigned to the adjusting part 28, is illustrated. Said passage opening is rotatable—as explained with respect to FIG. 4—in order thus to be brought to overlap to a greater or lesser extent with the channel section 1b in order to adjust the flow cross section of the nozzle 4.

Figure 6:
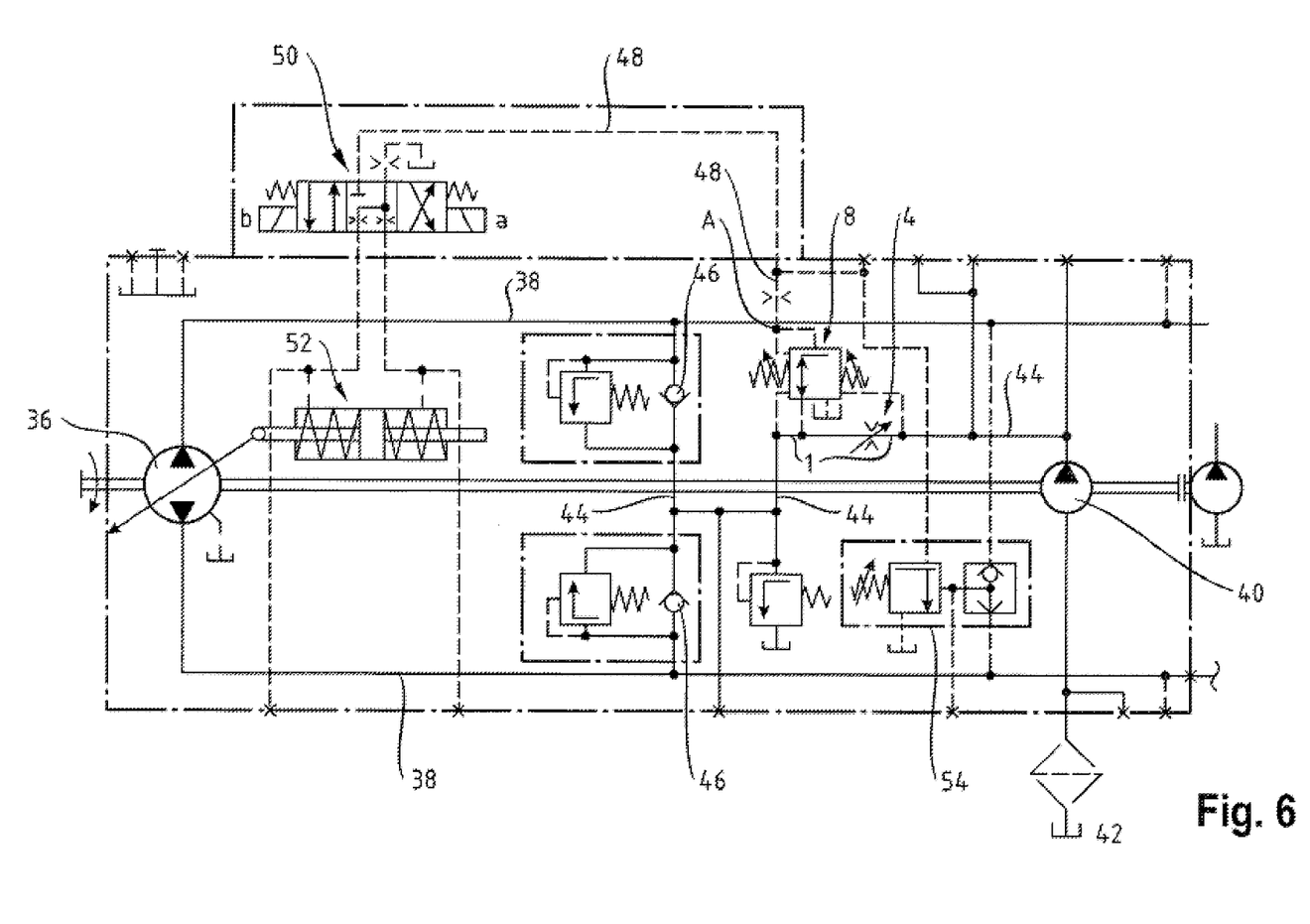
FIG. 6 shows a detail of an exemplary embodiment of a closed hydraulic circuit with the pressure-regulating arrangement according to the disclosure.

FIG. 6 shows a preferred use example of the pressure-regulating arrangement according to the disclosure in a closed hydraulic circuit, of which only the part on the drive side is shown in FIG. 6. The pressure-regulating arrangement corresponds to the exemplary embodiment described in the preceding drawings and has the main line 1, the adjustable nozzle 4 arranged therein and the pressure-regulating valve 8 which is connected to the latter.

The hydraulic circuit has a variable displacement pump 36 by which pressure medium can be conveyed into one of two working lines 38. The variable displacement pump 36 is driven by an internal combustion engine (not shown), wherein a feed pump 40, which is designed as a fixed displacement pump, is also driven via a rigid mechanical coupling. During the operation, said feed pump conveys replacement pressure means from a tank 42 via a feed line 44, in which the nozzle 4 is located, and via in each case one of two non-return valves 46 into the working line 38 in each case conducting the low pressure.

The main line 1 of the pressure-regulating arrangement forms a section of the feed line 44. An adjusting pressure line 48 is connected to the regulating connection A of the pressure-regulating arrangement or of the pressure-regulating valve 8, said adjusting pressure line supplying a double-action adjusting cylinder 52 of the variable displacement pump 36 via a continuously adjustable 4/2-port directional control valve 50. In this case, the pressure in an adjusting pressure line 48, which leads to the directional control valve 50, can be limited with the aid of a nozzle (not denoted specifically) and a pressure cutting-off device 54 which responds if the high pressure in the one or other working line 38 exceeds a certain value. The pressure level in the feed line 44 downstream of the nozzle 4 and therefore the low pressure level in one of the working lines 38 is established in a generally known manner by adjusting a pressure-limiting valve, which is apparent from FIG. 6 but is not denoted specifically, to a value within the range of 25 to 30 bar. In the event of a change in the delivery rate of the fixed displacement pump 40, the pressure differential changes via the nozzle 4, i.e. substantially because of a rise in pressure upstream of the nozzle.

The pressure-regulating arrangement with the orifice plate which is adjustable according to the disclosure or with the restrictor or nozzle 4 serves in the preferred use example shown in FIG. 6 for adjusting the variable displacement pump 36 in dependence on the rotational speed, which corresponds to the rotational speed of the fixed displacement pump 40.

In a departure from the exemplary embodiment shown, instead of the hexagon socket 32 (compare FIG. 4), an electric adjusting pinion for rotating the adjusting part 28 and therefore for adjusting the nozzle 4 may be provided. The characteristic or the regulating pressure $p_A$ can therefore be automatically adjusted during the operation of the pressure-regulating arrangement according to the disclosure or of the hydraulic circuit.

In the preceding description of the drawings, the closing direction should be understood as meaning the direction of movement of the stepped piston 12, wherein the regulating connection A is connected to the tank connection T. This direction is directed upward in FIGS. 3 to 5. The opening direction should be understood as meaning the direction of movement of the stepped piston 12, in which the regulating connection A is connected to the pressure connection 6, as a result of which the outlet pressure $p_A$ is increased. This direction is directed downward in FIGS. 3 to 5.

A pressure-regulating arrangement is disclosed with a main line through which a flow can pass from an intake to an output and in which a nozzle or orifice plate or restrictor is arranged. Furthermore, the pressure-regulating arrangement has a pressure-regulating valve, the pressure connection of which is connected to the main line downstream of the nozzle. An outlet pressure of a regulating connection is adjustable via the pressure-regulating valve, for which purpose a valve body of the pressure-regulating valve is movable from a basic position in an opening direction in order to increase the outlet pressure. A first pressure which is tapped off from the main line upstream of the nozzle acts in the opening direction. The outlet pressure and a second pressure, which is tapped off from the main line downstream of the nozzle, act in a closing direction, which is opposed to the opening direction, in order to reduce the outlet pressure. In this case, the nozzle or orifice plate or restrictor is adjustable.

Furthermore, a closed hydraulic circuit is disclosed, said circuit having a variable displacement pump to which two working lines are connected, wherein pressure medium can be conveyed into the two working lines, in each case into the working line conducting low pressure, via a feed line by a constant feed pump coupled to the variable displacement pump. In this case, a previously described pressure-regulating arrangement is provided, the main line of which forms a section of the feed line, and the outlet connection of which is connected to an adjusting device of the variable displacement pump.

What is claimed is:

1. A pressure-regulating arrangement, comprising:
    a main line, in which an adjustable nozzle is arranged; and
    a pressure-regulating valve having a pressure connection, a tank connection and a regulating outlet, wherein;
        the pressure connection is connected to the main line downstream of the nozzle;
        an outlet pressure at the regulating outlet is adjustable via the pressure-regulating valve;
        a valve body of the pressure-regulating valve is acted upon by a first pressure of the main line upstream of the nozzle in a direction of connecting the regulating outlet to the pressure connection and increasing the outlet pressure, and by the outlet pressure and a second pressure of the main line downstream of the nozzle in a direction of connecting the regulating outlet to the tank connection and reducing the outlet pressure,
        wherein the valve body is precentered in a basic position by a spring arrangement, the spring arrangement including a spring with two end sections which are movable and in which a pretensioning of the spring is adjustable;
        wherein a connection from the pressure connection to the regulating outlet is openable in an opening direction; and
        wherein a connection from the regulating outlet to the tank connection of the pressure-regulating valve is openable in a closing direction.

2. The pressure-regulating arrangement according to claim 1, wherein:
    the valve body is a stepped piston;
    a first control surface, which is acted upon by the first pressure, and a first control pressure space are formed in a region of a first end section of the stepped piston;
    a second control surface, which is acted upon by the second pressure, and a second control pressure space are formed in a region of a second end section of the stepped piston; and
    an annular surface which is acted upon by the outlet pressure is arranged between the first end section and the second end section.

3. The pressure-regulating arrangement according to claim 2, further comprising a channel section of the main line which runs approximately parallel to the stepped piston, the channel section having an end, wherein:
    the nozzle is arranged in an approximately right-angled bend of the main line at the end of the channel section, as viewed in a direction of flow; and
    the nozzle is formed by a first passage opening and a second passage opening which are movable with respect to each other.

4. The pressure-regulating arrangement according to claim 3, wherein:
    the first passage opening is provided on a housing; and
    the second passage opening is formed in a circular cylindrical adjusting part which is rotatable about an axis of rotation which runs approximately at a right angle to the channel section.

5. The pressure-regulating arrangement according to claim 2, wherein:
    the first control surface and the second control surface are much larger than the annular surface.

6. The pressure-regulating arrangement according to claim 2, wherein:
    an outside diameter of the annular surface and diameters of the first control surface and of the second control surface are the same size.

7. The pressure-regulating arrangement according to claim 2, wherein:
    the second control surface is connected via a longitudinal bore of the stepped piston to at least one radial bore of the stepped piston; and
    said radial bore is arranged between the first control surface and the annular surface.

8. The pressure-regulating arrangement according to claim 2, wherein:
    the annular surface is surrounded by an outlet pressure space; and
    a tank pressure space which is connected to the tank connection via a tank channel is formed between the second control pressure space and the outlet pressure space.

* * * * *